United States Patent Office 3,259,665
Patented July 5, 1966

3,259,665
PROCESS FOR THE POLYMERIZATION OF SPIRO COMPOUNDS
Arthur D. Ketley, Bethesda, Md., assignor to W. R. Grace & Co., New York, N.Y., a corporation of Connecticut
No Drawing. Filed Aug. 28, 1963, Ser. No. 305,218
6 Claims. (Cl. 260—666)

This invention relates to the polymerization of spiro compounds. More particularly this invention is concerned with polymerizing spiroalkanes containing a cyclopropyl ring of the formula

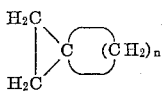

wherein $n$ is an integer from 4 to 12.

Similarly this invention is concerned with polymerizing spiroalkanes containing the cyclopropyl ring of the formula

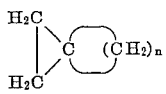

where $n$ is an integer from 4 to 12 by subjecting said spiroalkanes to the action of a Friedel-Crafts catalyst at a temperature from 0 to 150° C. preferably in the absence of a solvent.

I have shown that the cyclopropyl compound of the formula

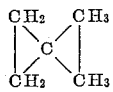

polymerizes in the presence of a Friedel-Crafts catalyst at sub-zero temperature to yield polymers having the following recurring structural unit

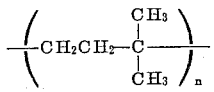

See A. D. Ketley, "The Cationic Polymerization of 3-Methylbutene-1 and 1,1 Dimethylcyclopropane," Polymer Letters, J. Polymer Sci., Part B, vol. 1 No. 6, June (1963), p. 313.

The new compounds in the instant invention have the following recurring structural unit

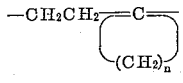

wherein $n$ is an integer from 4 to 12, said integer being the same as in the monomer reactant.

In the spiroalkanes of the instant invention the cyclopropyl ring cannot be substituted. However, the larger cycloalkyl ring can be substituted with alkyl groups. In addition the larger cycloalkyl ring can be substituted with other constituents, aside from alkyl groups and result in novel polymers without affecting the reaction as long as said substituents do not complex with or otherwise destroy the Friedel-Crafts catalyst. Hence, the criterion of substituents selection is whether or not the substituents complexes with or destroys the Friedel-Crafts catalyst. Such a selection is obvious to one skilled in the art.

The polymerization reaction is preferably performed in the absence of a solvent. However, the reaction is operable in the presence of a solvent. Any solvent in which the monomer dissolves and preferably in which the polymer formed precipitates and which remains liquid under the reaction conditions is operable. Obviously the solvent must also be one that does not react with or kill the catalyst. A preferred class of solvents includes but is not limited to chlorinated hydrocarbons. Examples of said preferred class of solvents include methyl chloride, butyl chloride, ethyl chloride and the like. Saturated hydrocarbons such as butane, propane and pentane are also operable as solvents in the instant invention. Other well known solvents are obvious to one skilled in the art.

As used herein, Friedel-Crafts catalyst means any Lewis acid capable of initiating catonic, that is, carbonium ion type polymerization. Examples of Friedel-Crafts catalyst include but are not limited to $AlCl_3$, $RlBr_3$, $BF_3$ $SnCl_4$.

The amount of Friedel-Crafts catalyst used in this invention can be varied within wide limits. A monomer: Friedel-Crafts catalyst weight ratio in the range 100:1 to 1:1 is operable in performing this invention.

The polymer products of this invention have many and varied uses. The polymer products can be used as lubricating oils, oil additives, adhesives, high temperature fluids, e.g., brake fluids, and the like.

The number average molecular weight of the polymer products of this invention were measured on a Mechrolab Vapor Pressure Osmometer, Model 301-A, manufactured by Mechrolab Inc., Mountain View, Calif., in accordance with the instructions therefor.

The I.R. spectra of the polymer products of the invention were obtained with a Perkin-Elmer 21 IR spectrometer using a 1 ml. smear of the polymer.

The following examples are set down to illustrate and in no way limit the invention. Unless otherwise specified herein all parts and percentages are by weight.

The spiroalkanes monomers of the instant invention can be prepared as in the following example. Although the example shows the preparation of only one of the spiroalkane monomers of the instant invention, the method is operable for all the spiroalkanes monomers containing the cyclopropyl ring necessitating only the appropriate choice of the starting cycloalkyl bromide. Such a choice is obvious to one skilled in the art.

*Example 1.—Preparation of monomer reactant*

Cyclohexyl bromide was distilled at 36° C. at 6 mm. Hg. Grignard reagent was made with 300 cc. cyclohexyl bromide (2.44 moles), 1100 cc. diethyl ether (dried over sodium), and 2.68 moles magnesium between 25° C. and the reflux temperature of diethyl ether. Upon completion of the Grignard reaction, 85 grams of polyoxymethylene was heated in a 2 neck 500 ml. flask, and the resulting formaldehyde (gas) led through a tube to a capillary tube which was well under the surface of the Grignard solution. The tube and capillary had to be heated at ¼ hr. intervals to prevent clogging of condensed, repolymerized formaldehyde. Upon introduction of formaldehyde to Grignard solution, an immediate exotherm and refluxing of ether began. The temperature was controlled with an ice bath. All the formaldehyde was introduced in 3½ hrs. At the end of this period, formaldehyde began to condense and polymerize in the reflux condenser, which indicated the Grignard solution was used up as a reactant. The capillary was removed and the entire solution poured slowly into a 4 liter beaker containing 2 liters 30% $H_2SO_4$ and ice. After sufficient stirring the organic layer and water layer were separated and the water layer was saturated with NaCl and washed in ether to remove any product in solution. The ether layers were then dried over dry $MgSO_4$ and distilled to recover cyclohexane methanol. Yield of the alcohol was 162 grams.

The boiling point of the alcohol was 85° C./22 mm. 155 grams (1.36 moles) of the cyclohexyl methanol were placed in 500 ml. 3 neck flask with stirrer and $N_2$ flow to operate under anhydrous, oxygen free conditions. Acetic anhydride (freshly distilled, 1.36 moles or 139 grams) were placed in a dropping funnel attached to the flask and 0.16 gram phosphoric acid (1.75 g./cc.) were added to the acetic anhydride. The flask was immersed in an ice water bath and the aforesaid $(CH_3CO)_2O$ was added to the flask over 3 hour period during which vigorous stirring was maintained. When addition was completed, the flask was allowed to come to room temperature, and then cooled to 0° C. Reaction left for 24 hours at 0° C. with stirring. Deionized water (500 cc.) was added to the reaction and reaction mixture was washed thoroughly. The organic layer was dried overnight (over anhydrous $MgSO_4$) and distilled. 188.5 grams of crude cyclohexylmethyl acetate was obtained (90% theoretical). Boiling point of the pure product was 83° C./14 mm.

The cyclohexylmethylacetate was pyrolized in a quartz tube (1″ I.D.) in a tube furnace (2 ft. length 1″ side), controlled by a variac so placed that the tube would be in a vertical position. The tube was packed firmly with glass wool, and a sealed tube containing a thermo couple wire was embedded in the wool at approximately the center of the tube. This wire was connected to a temperature recorder which was tested and found to be accurate. A dropping funnel was used to introduce the ester in to the tube. During the polymerization a light $N_2$ flow was maintained to assure movement of the mixture through the tube. At the end of the tube, a condenser was used to cool material coming out of tube, followed by a collecting flask which was cooled in an ice water bath. The temperature of the tube was maintained at 475–480° C. and the ester added at a rate of 7 cc./hr.

The product which collected in flask was then washed with 7% sodium carbonate solution till $CO_2$ evolution ceased, and then washed with salt water and dried over anhydrous $MgSO_4$. Gas chromatography showed about 60% conversion to methylene cyclohexane. When the ester had passed the tube, distillation gave 55.3 grams (.57 mole) of methylene cyclohexane.

In a 250 ml. flask with magnetic stirrer, condenser and drying tube, was placed 15.2 grams Zn/Cu couple, 2.54 gm. iodine (0.2 mole), and 130 ml. sodium dried diethyl ether. To this was added (under anhydrous conditions) a mixture of .30 mole (28.8 gm.) redistilled methylene cyclohexane, and .15 mole (40.17 gm.) distilled methylene iodide ($CH_2I_2$). After addition, solution was heated to gentle reflux and allowed to react for 48 hours. After 8 hours no visual change was apparent. Very slight exotherm believed to have occurred in 56 minutes after introduction of olefin+$CH_2I_2$. After reacting overnight red copper was present and by noon more red color formed; several hours later more red colored copper was present. Appearance of copper indicated that the Zn must be reacting, thus freeing the copper. Reaction allowed to continue overnight again, and stopped in the following morning (total reaction time 48 hours).

Upon completion of 48 hour reaction period, solution was cooled, filtered, washed respectively with 5% HCl, 5% $NaHCO_3$ and water. It was dried over $MgSO_4$ (anhydride) and fractionated through semi-micro distillation column. Upon distilling, 12 grams of unreacted methylene cyclohexane was first fraction (101–102° C.). Temperature then began to slowly rise and all material boiling below 124° C. (760 mm.) was taken as separate weight. 4.5 gram of spiro-2,5-octane was then collected, having a boiling point of 124–125° C. at 760 mm.

*Example 2.—Polymerization of spiro-2,4-heptane*

A 50 ml. flask equipped with stirrer was heated thoroughly for about 5 minutes under heavy nitrogen flow to remove all moisture. 5 grams of spiro-2,4-heptane were added to the flask and the flask was cooled to −78° C. in a Dry Ice-acetone bath. 0.5 gram $AlBr_3$ dissolved in 5 ccs. of ethyl chloride was cooled to −78° C. and then added to the flask under nitrogen pressure. At −78° C. no reaction was noticed other than the color of the solution changing to light red due to the catalyst. The reaction mixture was gradually warmed to room temperature. After 1 minute thereat, no reaction was noted. The solution temperature was then raised to 30° C. driving off the remaining ethyl chloride. In addition 0.2 gram of $AlBr_3$ was added to the reaction mixture. After about 30 seconds a vigorous exotherm began and lasted for approximately ½ minute. Upon completion of the exotherm the solution was very viscous. An additional 0.2 gram $AlBr_3$ was added to the reaction but no exotherm resulted evidencing that the reaction was complete. 50 ml. of methanol was added to the reaction mixture to decompose the catalyst. The polymer formed was then thoroughly washed with additional methanol. The polymer was separated from the reaction mixture and methanol and heated on a water bath at 40° C. while under 1 millimeter Hg vacuum for 2 hours. The yield of poly-2,4-spiroheptane was 3.7 grams and the number average molecular weight of the polymer was 978.

*Example 3.—Polymerization of spiro-2,5-octane*

The procedure and apparatus was the same as in Example 2. 9 grams of spiro-2,5-octane i.e.

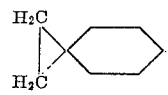

was cooled to −78° C. and charged to a nitrogen flushed reaction flask. 0.5 gram $AlBr_3$ dissolved in 5 ml. of ethyl chloride was cooled to −78° C. and then added to the reaction flask under nitrogen pressure. No reaction was noticed at −78° C. The reaction was brought to room temperature (25° C.) with no change. 0.25 gram of $AlBr_3$ was added at 25° C. and an immediate exotherm was noted as in Example 2. The exotherm was complete in 30 seconds and the solution was quite viscous. The viscous solution was washed with methanol to destroy the catalyst. The polymer was separated from the solution and methanol washes and placed on a water bath at 40° C. under 1 mm. Hg vacuum for 2 hours. After drying, the yield of polymer was 6.3 grams. The polymer had a number average molecular weight of 1063.

*Example 4*

Example 3 was repeated except that 10 grams of spiro-2,5-octane was used as the reactant and 0.5 gram of $AlCl_3$ was added to the reaction flask without any ethyl chloride solvent. The reaction was performed under a nitrogen blanket in a constant temperature bath at 40° C. for 30 minutes. A very viscous liquid which was difficult to stir resulted from the reaction. The polymer was washed as in Example 2. The polymer yield was in excess of 50% based on the monomer and the number average molecular weight was in the range of 900–1100.

The following example shows the ability of the Friedel-Crafts catalyst to polymerize spiroalkanes containing substituents on the larger cycloalkyl ring.

*Example 5.—Polymerization of 4-methyl-2,5-spiro octane*

1,4-dihydroxymethyl cyclohexane,

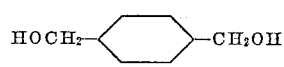

commercially available from Eastman Kodak Inc., was converted to its acetate with acetic anhydride and sodium acetate at 25° C. and thereafter pyrolyzed at 625° C. to yield 1,4 dimethylene cyclohexane, i.e.,

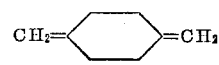

One of the two methylene group on the 1,4-dimethylene cyclohexane was reduced by hydrogen and Raney nickel to yield 4-methylmethylene cyclohexane of the formula:

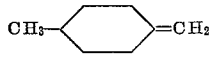

4-methylmethylenecyclohexane was converted to 4-methyl-2,5-spirooctane by reaction with methylene iodide and zinc copper couple under the conditions described for 2,5-spirooctane in Example 1. 10 grams of 4-methyl-2,5-spirooctane i.e.

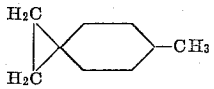

were charged to a 50 milliliter flask equipped with stirrer under a nitrogen flow. The flask was maintained at —78° C. in a Dry Ice-acetone bath. 0.5 gram of AlBr$_3$ was dissolved in 5 ml. ethyl chloride and cooled to —78° C. before being added to the reaction flask under nitrogen pressure. The reaction was then allowed to warm to room temperature. After 15 minutes at room temperature a 15° exotherm resulted and the polymer solution became very viscous. After washing up the polymer as in Example 2 the polymer was dried. A yield of excess of 20% based on the monomer of a polymer of 4-methyl-2,5-spirooctane having a number average of molecular weight 1087 resulted.

*Example 6.—Polymerization of spiro-2,7-decane*

Example 2 was repeated except that 10 gms. of spiro-2,7-decane was substituted for spiro-2,4-heptane. The resultant dried poly spiro-2,7-decane weighed in excess of 4 grams and had a number average molecular weight in the range 800–1000.

In practicing this invention it is not necessary that the reaction be performed in an oxygen free atmosphere. Moisture, however, should be vigorously excluded.

What is claimed is:
1. The process of polymerizing spiroalkanes containing a cyclopropyl ring of the formula

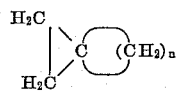

wherein $n$ is an integer from 4 to 12 which comprises subjecting under anhydrous conditions said spiroalkanes to the action of a catalytic amount of a Friedel-Crafts catalyst at a temperature in the range 0 to 150° C.

2. The process according to claim 1 wherein the weight ratio of monomer:Friedel-Crafts catalyst is in this range 100:1 to 1:1.

3. The process of polymerizing spiro-2,4-heptane which comprises subjecting under anhydrous conditions spiro-2,4-heptane to the action of a catalytic amount of a Friedel-Crafts catalyst at a temperature in the range 0 to 150° C.

4. The process of polymerizing spiro-2,5-octane which comprises subjecting under anhydrous conditions spiro-2,5-octane to the action of a catalytic amount of a Friedel-Crafts catalyst at a temperature in the range 0 to 150° C.

5. The process of polymerizing 4-methyl-2,5-spiro octane which comprises subjecting under anhydrous conditions 4-methyl-2,5-spiro octane to the action of a catalytic amount of a Friedel-Crafts catalyst at a temperature in the range 0 to 150° C.

6. The process of polymerizing spiro-2,7-decane which comprises subjecting under anhydrous conditions spiro-2,7-decane to the action of a catalytic amount of a Friedel-Crafts catalyst at a temperature in the range 0 to 150° C.

References Cited by the Examiner
UNITED STATES PATENTS
2,392,398  1/1946  McMillan et al. _____ 260—666

OTHER REFERENCES
A. D. Ketley, J. Polymer Science, Pt. B, vol. 1, pp. 313–316, June 1963.
R. W. Shortridge et al., J. Am. Chem. Soc., vol. 70, pp. 946–949, 1947.

DELBERT E. GANTZ, *Primary Examiner.*
V. O'KEEFE, *Assistant Examiner.*